Sept. 29, 1964     S. WOZAR     3,150,448
DENTAL SURVEYOR ATTACHMENT
Filed April 11, 1961     3 Sheets-Sheet 1

INVENTOR.
SAUL WOZAR
BY
ATTORNEYS

Sept. 29, 1964  S. WOZAR  3,150,448
DENTAL SURVEYOR ATTACHMENT
Filed April 11, 1961  3 Sheets-Sheet 3

INVENTOR.
SAUL WOZAR
BY
ATTORNEYS

# United States Patent Office 3,150,448
Patented Sept. 29, 1964

3,150,448
DENTAL SURVEYOR ATTACHMENT
Saul Wozar, U.S. Air Force (6486th U.S. Air Force
Dispensary, A.P.O. 953, San Francisco, Calif.)
Filed Apr. 11, 1961, Ser. No. 102,325
4 Claims. (Cl. 32—67)
(Granted under Title 35, U.S. Code (1952), sec. 266)

The invention described herein may be manufactured and used by or for the United States Government for governmental purposes without the payment to me of any royalty thereon.

This invention relates to dental appliances, and more specifically to an attachment for dental survey instruments by means of which certain types of artificial denture attachments may be rapidly and accurately charted for attachment to a denture, the device being designed to be clamped or fixed on any dental "surveyor" instrument of the type commonly known as "broken arm" surveyor instruments.

These surveyor instruments are used in dental laboratories and by prosthodontists who specialize in the fabrication of dental appliances such as dentures which are to be secured to sound teeth.

The invention is intended to enable the designing dentist or laboratory technician to find the exact spot of the "undercut" area necessary for retention of dental appliances, this accuracy being of extreme importance when the denture castings are made of such materials as chrome cobalt alloys, the attachment providing means for locating and marking the exact point of contact of the "undercut" gage against or on the "infra bulge" area of the design model. This results in a mark on the exact point of contact of the undercut gage that the designing officers or technicians can then draw their design of the denture on the model with accuracy.

An object of the invention therefore is the provision of attachment means for cooperation with the undercut gage of a denture survey instrument for determining the desired "infra bulge" area on a dental design model for properly fitting a denture thereto.

A further object is the provision of means for determining the exact spot of the undercut area on a dental design model including the provision of inking means for inking the undercut gage for determining and marking the correct position of the undercut gage of a dental surveyor device, necessary for determining the exact spot of or in the undercut area necessary for retention of the artificial denture on the sound teeth of the person for whom the denture is to be made.

A further object is the provision of an improved dental model marking device in which one hand only is required to completely manipulate and operate the instrument during marking and gaging.

More particularly, the invention comprises inking means which is fixedly supported by the standard support of a "broken arm" dental surveyor instrument, whereby an undercut gage thereof can be inked and then brought into contact with the desired "infra bulge" area of the dental design model to produce a mark thereon at the exact point of contact, so that the prosthodontist or technician can design and properly fit an artificial denture thereto.

Other objects and advantages will become apparent from the following description and accompanying drawings in which like reference characters refer to like parts in the several figures.

Figure 1:
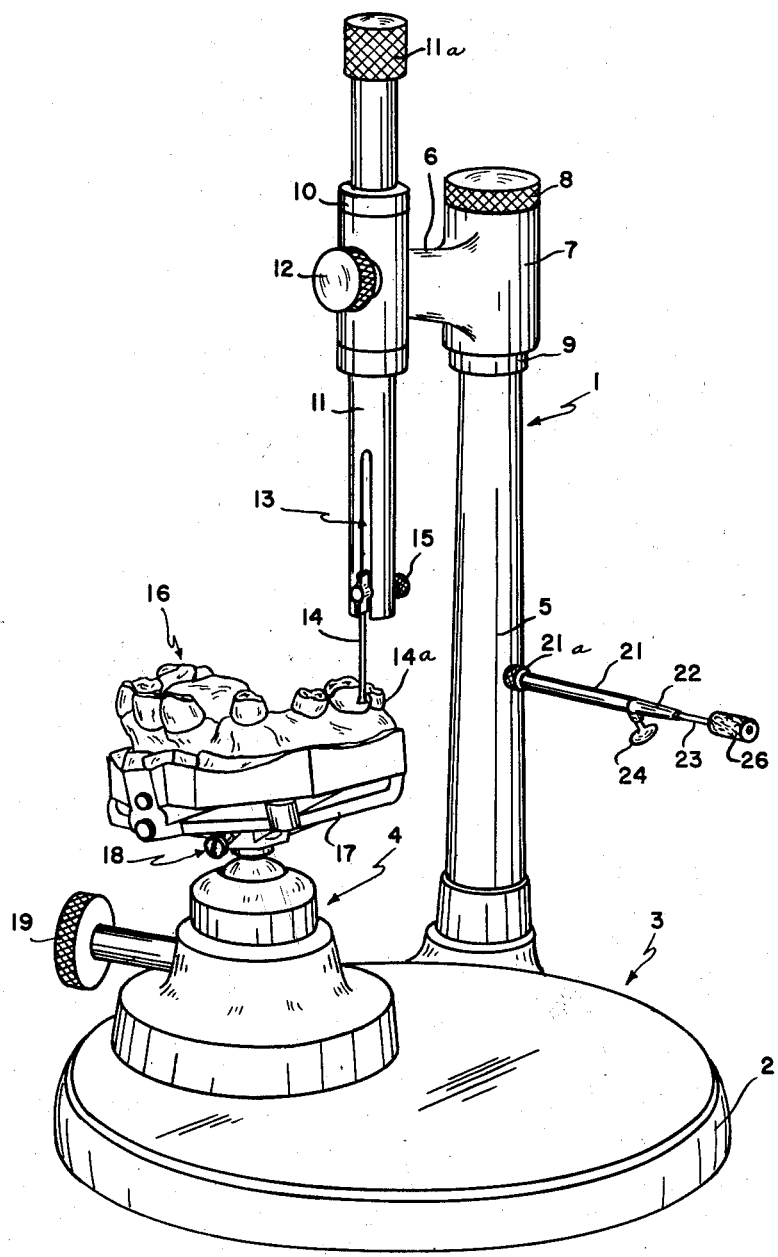
FIG. 1 is a perspective view of a dental surveyor instrument having my inking and marking device applied thereto, illustrating the undercut gage applied to a denture model or cast at the proper position in the "infra bulge" area for marking the exact spot of or in the undercut area so that the clasp or position thereof on or for the model can be accurately determined.

In the drawings the reference numeral 1 denotes a conventional dental survey instrument comprising a main stationary circular base or platform 2 on which the various parts of the surveyor instrument are mounted, the base being smoothly machined in a horizontal plane on its topside 3 to provide a support for the surveying mechanism, indicated generally by the reference numeral 4, which is in the form of a conventional adjustable dental cast holder that is slidable to different positions on the surface 3.

Rising from the base 2, at one side thereof, is a vertical post or standard 5 on which is pivotally mounted, in suitable bearings, a tool carrying arm 6, swingable in a plane parallel to the surface 3 of the base 2, a thumb screw 8 being provided for tightening the arm 6 on the post 5.

The horizontal tool carrying arm 6, of course, has a sleeve bearing 7 which fits a cylindrical bearing surface on the upper end of the post 5, and suitable stop means 8 and 9 are provided to prevent any vertical movements of the arm 6 on the post 5.

The outer or free end of the arm 6 is provided with a second sleeve or vertical bearing member 10 having an axis perpendicular to the surface 3 in which is slidably and rotatably fitted a vertically adjustable tool holder 11 and a set screw member 12 is suitably carried by the sleeve bearing 10 for securing the tool holder 11 in any desired vertical adjustment, or permitting vertical and rotative adjustments thereof by the "surveyor" or technician.

The upper end of the tool holder 11 is provided with a knurled manipulating head 11a while the lower end thereof is slotted longitudinally along one side at 13 to receive, in this case, the undercut gage member 14 having a circular, slightly enlarged measuring and marking head portion 14a. Any suitable securing means, indicated at 15, may be provided for fixing the undercut gage 14 in position in the slot 13 of the tool or gage holder 11.

In the drawings the reference numeral 16 indicates a dental cast to be surveyed for an artificial denture such as a "bridge work" for clasps for securing the same to sound teeth. The model plate holder or cast holder 4 has a wide circular smooth base and includes a universally tiltable cast support and clamping plate 17, which is universally adjustable at 18 in a ball and socket connection which is tightened by the thumb screw 19.

The above construction so far described is substantially conventional, the device being known as a (dental) "surveyor."

Figure 2:
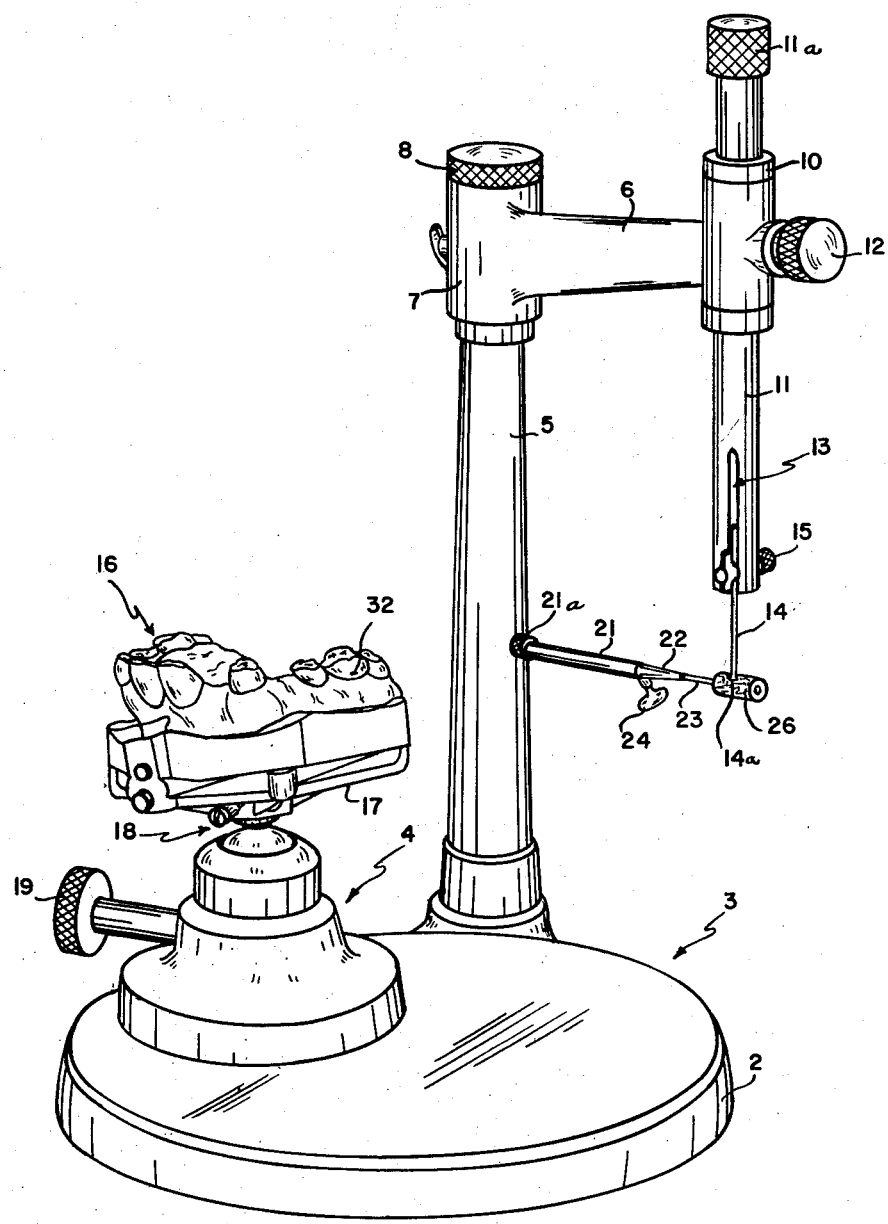
FIG. 2 is a view somewhat similar to FIG. 1, but showing the undercut gage swung into position for inking, prior to its application to the dental cast.
Figure 3:
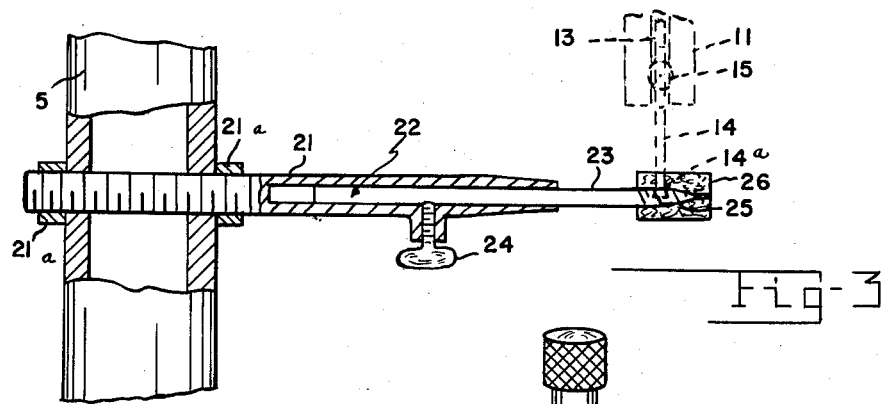
FIG. 3 is a fragmentary sectional view of the supporting standard, illustrating the construction of the adjustable undercut tool inking device, some parts being shown in section.

Reference is being made to FIGS. 1, 2 and 3. The vertical post or standard 5, at some convenient point in its length, about on the plane of the head 14a of the undercut gage 14 is provided with a transverse aperture through which is fitted a horizontal supporting shaft or rod 21, disposed parallel to the surface 3 but extending to one side thereof, this rod 21 having a concentric stem receiving bore 22 in its outer end into which is fitted a supporting stem member 23, permitting axial extension or retraction of the stem member 23 on the rod or arm 21, the arm 21 being fixed by any suitable means against longitudinal displacement in the hole 21 by collars or nuts 21ª threaded or otherwise secured on the rod, holding it in place.

As seen in FIG. 3 the supporting stem member is radially adjustable on or in the rod or shaft in the bore 22 and a set screw member 24 which is threaded in a boss on the side of the shaft 21 is disposed for engaging and securing the rod 23 in any longitudinal adjusted position.

The outer end of the rod 23 is preferably screw threaded, as indicated at 25, onto which a preferably cylindrical inking pad 26 is concentrically screwed, as better seen in FIG. 3.

Figure 4:
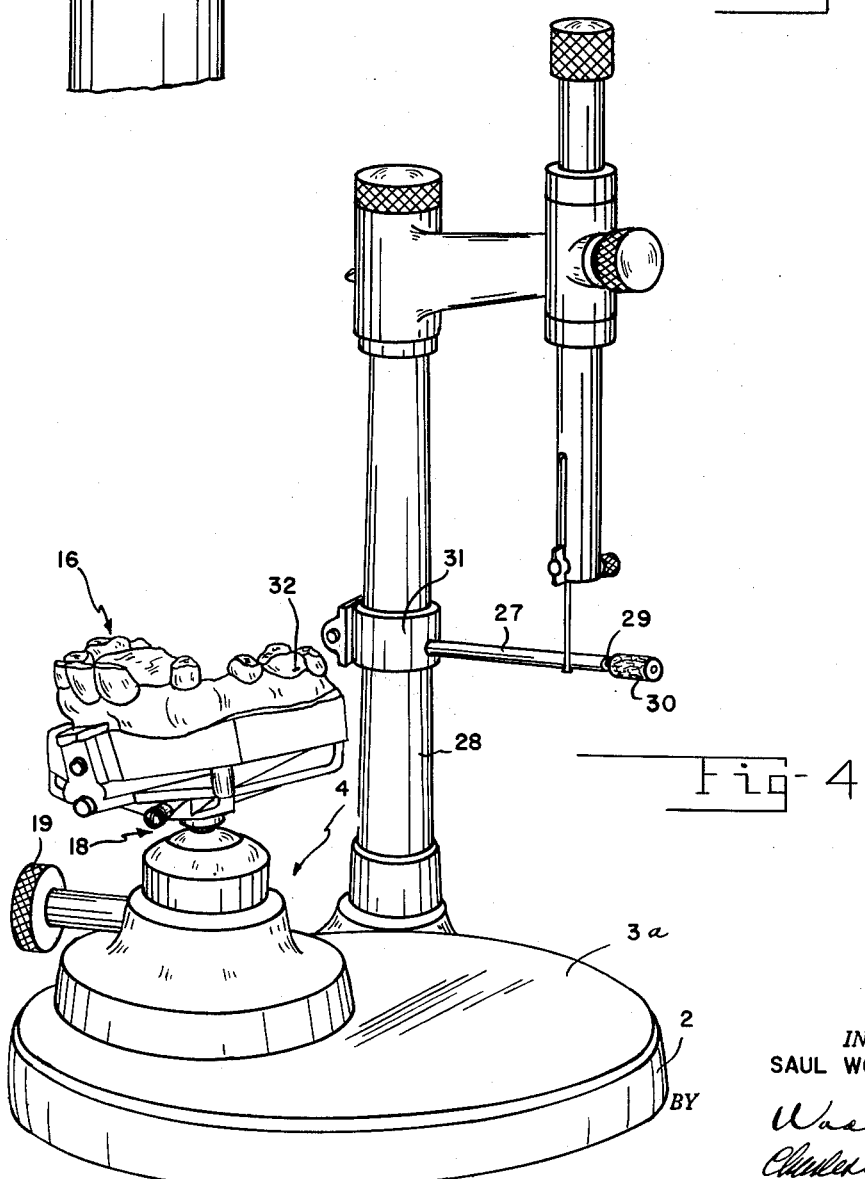
FIG. 4 is a view similar to FIG. 3, showing a slight modification.

In the form shown in FIG. 4 the supporting rod, indicated at 27, is adjustably mounted on the main vertical standard 28 for vertical adjustment toward and away from the flat supporting surface 3ª, as well as providing for radial adjustment of the pad carrying rod 29 on the end of which the cylindrical undercut determining tool inking pad 30 is screwed.

This construction may involve an encircling clamp 31 of the hose clamp variety to which is fixed, perpendicular to the vertical axis of the standard, a supporting rod 27; thus, by loosening, adjusting, and tightening the clamp 31 the supporting rod 27 can be raised, lowered and swingably adjusted to suit the technician. The cylindrical inking pad (30 or 26) is, of course, properly supplied with a suitable ink, such as red link of the stamp pad variety before commencing the undercut charting operation.

In the operation the dental casting 16 is first secured on the dental model plate supporting stand 4 and the proper tilting adjustments are made to "level" the cast in the usual well known manner, and the securing means 19 is tightened so that the cast of the teeth, particularly rear right, left and center tooth surfaces are at the desired or preferably the same distance above the supporting surface 3 of the base 2.

When the exact position of the undercut, at or below the "infra bulge" area of a tooth is desired, the stand or dental model plate support and the tool carrying support are or can be manipulated and the tool holder 11 can be raised or lowered and rotated to bring the lower, slightly flared, end 14ª of the undercut gage immediately adjacent to the side of the desired tooth of the casting where the "infra bulge" area and undercut portion is located. This can be done with precision by bringing the rim of the head 14ª into contact with the tooth casting. In order to determine and mark this exact point of contact the head 14ª of gage 14 is brought into inking contact with the cylindrical inking pad on the outer end of the stem 23 (or 27), after which the arm 6, and gage 14 can be easily manipulated to bring the flared rim of the gage 14 into the desired position of contact on the tooth casting. It might be noted that previously it was not possible to mark this point on the tooth in the exact position desired, even with the gage head 14ª in contact with the tooth, also it required two hands to manipulate the surveyor instrument and mark the tooth with a sharp pointed pencil. Even then the mark which the technician made and employed was not exactly coincident with the correct position as determined by the undercut gage. With applicant's invention the device can easily be manipulated by the technician with one hand and the desired undercut mark, being made by the gage itself, is at the precise point desired relative to the infra bulge area.

In FIG. 1 the gage 14 is shown disposed alongside of a desired "anchor" tooth casting in the required undercut area. The tool can be rotated in the bearing by the head 11ª or just pressed against the tooth, and since the head had been inked by swinging the arm 16 to bring the head 14ª in inking contact with the cylindrical inking pad 26 (as seen in FIG. 2) any pressure against the tooth by the head 14ª will leave an inked (red) mark on the tooth facsimile. When these marks for the denture clasp member receiving areas are all determined the technician can now accurately sketch in the denture design and complete the same with assurance that the same will fit and be satisfactory.

While in the foregoing there has been shown and described the preferred embodiments of this invention it is to be understood that minor changes in the details of construction, combination and arrangement of parts may be resorted to without departing from the spirit and scope of the invention, as defined in the following claims.

I claim:

1. In combination; a base member having a horizontal supporting surface adapted to support a dental cast thereon to be surveyed, a rigid upright supporting standard fixed to siad base member at one side thereof, a supporting arm journalled on said standard for swinging adjustments above said supporting surface in a plane parallel to said supporting surface, a "surveyor" tool carrier journalled at the free end of said arm for vertical adjustments toward and away from a dental cast disposed on said surface and for rotative adjustment on an axis perpendicular to said surface, a dental undercut gage member fixed in the lower end of said carrier in offset relation to the axis having an enlarged concentric marking rim thereon for charting engagement with the dental cast for determining the positions of clasp members on sound teeth represented on the dental cast with respect to the infra bulge areas of sound engaging teeth when said arm is swung toward the dental cast, and inking means for inking the rim of said gage carried by said standard in a plane parallel to said supporting surface in the path of movement of said rim when the arm and tool carrier are swung in a direction away from said dental cast, whereby when the inked rim is moved by the arm in the opposite direction into contact with the teeth represented on the dental cast ink is transferred from the rim to the teeth represented on the dental cast.

2. Apparatus as claimed in claim 1 for inking the head of an undercut gage of a dental cast survey instrument in which said inking means includes a supporting arm therefore axially extensible away from and retractable toward said vertical standard, and includes means for retaining said arm in any predetermined extended or retracted positions.

3. A dental cast survey instrument as set forth in claim 2 in which said supporting arm has means for removably securing the same to the vertical standard of the dental survey instrument on one end and has a threaded extremity on the other end thereof, and a cylindrical inking pad concentrically screwed on said threaded extremity.

4. A dental survey instrument as set forth in claim 3 in which said inking device supporting arm means comprises an adjustable clamp adapted to engage said standard and support the last mentioned arm for vertical adjustments on the standard to dispose the inking pad at different predetermined distances above the supporting surface.

References Cited in the file of this patent

UNITED STATES PATENTS

| | | |
|---|---|---|
| 1,517,882 | Wuelker | Dec. 12, 1924 |
| 1,629,861 | Craigo | May 24, 1927 |
| 1,652,108 | Forbis | Dec. 6, 1927 |
| 2,095,665 | Greth | Oct. 12, 1937 |
| 2,108,980 | Wills | Feb. 22, 1938 |
| 2,146,599 | Smith | Feb. 7, 1939 |
| 2,618,068 | Apple | Nov. 18, 1952 |
| 2,803,884 | Polley | Aug. 27, 1957 |